United States Patent
Lee et al.

(10) Patent No.: US 11,072,670 B2
(45) Date of Patent: Jul. 27, 2021

(54) CATALYST COMPOSITION AND METHOD FOR PREPARING OLEFIN POLYMER USING SAME

(71) Applicant: LG Chem, Ltd., Seoul (KR)

(72) Inventors: Ye Jin Lee, Daejeon (KR); Hye Kyung Lee, Daejeon (KR); Eun Kyoung Song, Daejeon (KR); Daesik Hong, Daejeon (KR); Byung Seok Kim, Daejeon (KR); Eunyoung Shin, Daejeon (KR); Jinyoung Kwak, Daejeon (KR)

(73) Assignee: LG Chem, Ltd.

(*) Notice: Subject to any disclaimer, the term of this patent is extended or adjusted under 35 U.S.C. 154(b) by 0 days.

(21) Appl. No.: 16/765,352

(22) PCT Filed: Nov. 28, 2018

(86) PCT No.: PCT/KR2018/014839
§ 371 (c)(1),
(2) Date: May 19, 2020

(87) PCT Pub. No.: WO2019/124792
PCT Pub. Date: Jun. 27, 2019

(65) Prior Publication Data
US 2020/0354488 A1 Nov. 12, 2020

(30) Foreign Application Priority Data

Dec. 20, 2017 (KR) .................. 10-2017-0176417
Nov. 27, 2018 (KR) .................. 10-2018-0148558

(51) Int. Cl.
*C08F 110/02* (2006.01)
*C08F 210/16* (2006.01)
*C08F 210/14* (2006.01)

(52) U.S. Cl.
CPC .................. *C08F 110/02* (2013.01)

(58) Field of Classification Search
CPC .......... C08F 10/02; C08F 210/16; C08F 2/14; C08F 4/65925; C08F 4/65927; C08F 4/65904; C08F 4/65916; C08F 4/65912; C08F 2500/04; C08F 2500/06; C08F 2500/10; C08F 2500/12; C08F 2500/13
USPC ...................................................... 526/119
See application file for complete search history.

(56) References Cited

U.S. PATENT DOCUMENTS

| 8,507,621 B2* | 8/2013 | Jayaratne ............... B01J 31/143 526/113 |
|---|---|---|
| 2012/0010375 A1 | 1/2012 | Yang et al. |
| 2015/0266914 A1 | 9/2015 | Kashimoto et al. |
| 2015/0299352 A1 | 10/2015 | Sohn et al. |
| 2019/0010256 A1* | 1/2019 | Lee ............................ C08F 4/02 |
| 2019/0263942 A1 | 8/2019 | Jeong et al. |

FOREIGN PATENT DOCUMENTS

| CA | 2628442 C | 3/2014 |
|---|---|---|
| EP | 2545084 A2 | 1/2013 |
| EP | 3450467 A1 | 3/2019 |
| JP | 2014111568 A | 6/2014 |
| KR | 20080092340 A | 10/2008 |
| KR | 20130113322 A | 10/2013 |
| KR | 20140071142 A | 6/2014 |
| KR | 20160073081 A | 6/2016 |
| KR | 101725004 B1 | 4/2017 |
| KR | 20170073463 A | 6/2017 |
| KR | 20170082917 A | 7/2017 |
| KR | 20170106192 A | 9/2017 |
| KR | 20170106801 A | 9/2017 |
| WO | 2011111980 A2 | 9/2011 |
| WO | 2016036204 A1 | 3/2016 |

OTHER PUBLICATIONS

Extended European Search Report for Application No. 18892414.6 dated Oct. 27, 2020, 5 pages.
Alexakis, et al., "Mild Protection and Deprotection of Alcohols as Ter-Butyl Ethers in the Field of Pheromone Synthesis" Tetrahedron Letters, Jan. 1, 1988, pp. 2951-2954, vol. 29, No. 24.
Fleissner. "Langsames Rißwachstum and Zeitstandfestigkeit von Rohren aus Polyethylen." Kunststoffe, 1987, pp. 45-50, vol. 77, No. 1. (Machine generated translation of abstract attached.)
International Search Report for Application No. PCT/KR2018/014839 dated Mar. 12, 2019, 2 pages.

* cited by examiner

*Primary Examiner* — William K Cheung
(74) *Attorney, Agent, or Firm* — Lerner, David, Littenberg, Krumholz & Mentlik, LLP

(57) ABSTRACT

A catalyst composition and a method for preparing an olefin polymer by using the same are provided herein. In some embodiments, a catalyst composition includes a transition metal compound having a compound (A) represented by Chemical Formula 1 and a compound (B) represented by Chemical Formula 2 present in a molar ratio of 1.6:1 to 18. The catalyst composition has high activity in an olefin polymerization reaction and can contribute to a reduction of catalyst cost. The catalyst composition aides in high copolymerizability of olefin monomers, and the produced olefin polymers can exhibit excellent processability and long-term physical properties, suitable for a pipe.

9 Claims, No Drawings

CATALYST COMPOSITION AND METHOD FOR PREPARING OLEFIN POLYMER USING SAME

CROSS-REFERENCE TO RELATED APPLICATION(S)

The present application is a national phase entry under 35 U.S.C. § 371 of International Application No. PCT/KR2018/014839, filed on Nov. 28, 2018, which claims priority from Korean Patent Application No. 10-2017-0176417, filed on Dec. 20, 2017, and Korean Patent Application No. 10-2018-0148558, filed on Nov. 27, 2018, the disclosures of which are incorporated by reference herein.

TECHNICAL FIELD

The present invention relates to a catalyst composition having high activity and high polymerizability and a method for preparing olefin polymer using the catalyst composition.

BACKGROUND ART

In the existing commercial preparation process of polyolefin, Ziegler-Natta catalysts of titanium or vanadium compounds have been widely used. Although the Ziegler-Natta catalyst has high activity, it is a multi-active site catalyst and thus the molecular weight distribution of the produced polymer is wide and the compositional distribution of comonomers is not uniform, and thus, has a limit in securing desired physical properties.

Thus, recently, a metallocene catalyst in which a ligand comprising a cyclopentadiene functional group is bound to a transition metal such as titanium, zirconium, hafnium, etc. has been developed and widely used. The metallocene compound is generally activated with aluminoxane, borane, borate or other activators before use. For example, a metallocene compound having a ligand comprising a cyclopentadienyl group and two sigma chloride ligands uses aluminoxane as an activator. Such a metallocene catalyst is a single site catalyst having one kind of an active site, and it has advantages in that the molecular weight distribution of the produced polymer is narrow, and that the molecular weight, stereoregularity, crystallinity, particularly reactivity of comonomers may be controlled according to the structure of the catalyst and the ligand. However, polyolefin polymerized using a metallocene catalyst has narrow molecular weight distribution, and if applied for some products, productivity is remarkably decreased due to extrusion load and the like, rendering site application difficult.

In particular, in the case of an existing PE-RT pipe product, although it is an ethylene copolymer using a metallocene catalyst, there is an advantage in that the molecular weight distribution is narrow and thus, desired physical properties can be obtained. On the other hand, due to the narrow molecular weight distribution, long-term physical properties (FNCT) and processability showed a tendency to decrease compared to a conventional PE-RT.

DETAILED DESCRIPTION OF THE PRESENT DISCLOSURE

Technical Problem

In order to solve the above problem, it is an object of the present invention to provide a catalyst composition for preparing a polymer for pipes having high activity and high copolymerizability which supplements the disadvatage in product processing by improving BOCD (Broad Orthogonal Co-monomer Distribution) and ensures excellent physical properties, and a method for preparing olefin polymer using the same.

Technical Solution

According to one embodiment of the present invention, there is provided a catalyst composition comprising a transition metal compound having a compound (A) represented by the following Chemical Formula 1 and a compound (B) represented by the following Chemical Formula 2 present in a molar amount of 1.6:1 to 18:1.

[Chemical Formula 1]

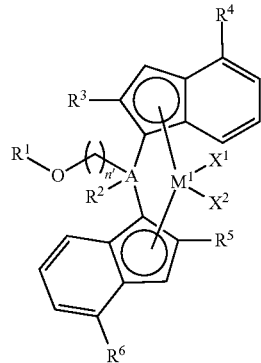

in Chemical Formula 1, $M^1$ is a Group 3 transition metal, a Group 4 transition metal, a Group 5 transition metal, a lanthanides transition metal or an actinides transition metal, $X^1$ and $X^2$ are identical to or different from each other, and each independently, a halogen, A is a Group 14 atom, n' is an integer between 1 and 20, $R^1$ is alkyl having 1 to 20 carbon atoms, alkenyl having 2 to 20 carbon atoms, alkylaryl having 7 to 30 carbon atoms, arylalkyl having 7 to 30 carbon atoms, or aryl having 6 to 30 carbon atoms, $R^2$ is hydrogen, alkyl having 1 to 20 carbon atoms, alkenyl having 2 to 20 carbon atoms, alkylaryl having 7 to 30 carbon atoms, arylalkyl having 7 to 30 carbon atoms, or aryl having 6 to 30 carbon atoms, $R^3$ and $R^5$ are identical to or different from each other, and each independently, alkyl having 1 to 20 carbon atoms, $R^4$ and $R^6$ are each independently alkyl aryl having 7 to 30 carbon atoms or aryl having 6 to 30 carbon atoms, in $R^3$, $R^4$, $R^5$ and $R^6$, $R^3$ and $R^5$ are different substituents from each other, or $R^4$ and $R^6$ are different substituents from each other,

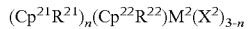

[Chemical Formula 2]

in Chemical Formula 2, $M^2$ is a Group 4 transition metal;

$Cp^{21}$ and $Cp^{22}$ are identical to or different from each other, and each independently, any one selected from the group consisting of cyclopentadienyl, indenyl, 4,5,6,7-tetrahydro-1-indenyl, and fluorenyl radical, wherein $Cp^{21}$ and $Cp^{22}$ are optionally substituted with hydrocarbon having 1 to 20 carbon atoms;

$R^{21}$ and $R^{22}$ are identical to or different from each other, and each independently, hydrogen, alkyl having 1 to 20 carbon atoms, alkoxy having 1 to 10 carbon atoms, alkoxyalkyl having 2 to 20 carbon atoms, aryl having 6 to 20 carbon atoms, aryloxy having 6 to 10 carbon atoms, alkenyl having 2 to 20 carbon atoms, alkylaryl having 7 to 40 carbon atoms, arylalkyl having 7 to 40 carbon atoms, arylalkenyl having 8 to 40 carbon atoms, or alkynyl having 2 to 10 carbon atoms;

$X^2$ is a halogen atom, alkyl having 1 to 20 carbon atoms, alkenyl having 2 to 10 carbon atoms, alkylaryl having 7 to 40 carbon atoms, arylalkyl having 7 to 40 carbon atoms, aryl having 6 to 20 carbon atoms, substituted or unsubstituted alkylidene having 1 to 20 carbon atoms, substituted or unsubstituted amino group, alkylalkoxy having 2 to 20 carbon atoms or arylalkoxy having 7 to 40 carbon atoms; and n is 1 or 0.

According to another embodiment of the present invention, there is provided a method for preparing olefin polymer comprising polymerizing olefin monomers in the presence of the above-described catalyst composition.

The olefin monomers that can be used in the above preparation method may include one or more selected from the group consisting of ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbonadiene, ethylidene norbordene, phenyl norbordene, vinyl norbordene, dicylcopentadiene, 1,4-butadiene, 1,5-pentadiene, 1,6-hexadiene, styrene, alpha-methylstyrene, divinylbenzene and 3-chloromethlystyrene.

Advantageous Effects

According to the present invention, there can be provided a catalyst composition which not only can exhibit high activity in an olefin polymerization, in particular in the preparation of ethylene polymers, but also can secure excellent processability and long-term physical properties by broadening the molecular weight distribution of the olefin polymer to be synthesized and can contribute to a reduction of catalyst cost, and a method for preparing olefin polymer using the catalyst composition. Therefore, the olefin polymer prepared according to the method of the present invention has excellent processability and long-term physical properties and therefore, is suitable for use in pipes.

DETAILED DESCRIPTION OF THE EMBODIMENTS

Hereinafter, a transition metal compound, a catalyst composition comprising the same, and a method for preparing olefin polymer using the catalyst composition according to specific embodiments of the present invention will be described.

According to one embodiment of the present invention, a catalyst composition comprising a transition metal compound having a compound (A) represented by the following Chemical Formula 1 and a compound (B) represented by the following Chemical Formula 2 present in a molar ratio of 1.6:1 to 18:1 is provided.

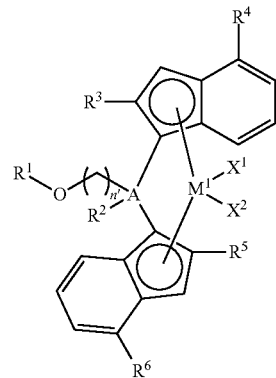

[Chemical Formula 1]

in Chemical Formula 1, $M^1$ is a Group 3 transition metal, a Group 4 transition metal, a Group 5 transition metal, a lanthanides transition metal or an actinides transition metal, $X^1$ and $X^2$ are identical to or different from each other, and each independently, a halogen, A is a Group 14 atom, n' is an integer between 1 and 20, $R^1$ is alkyl having 1 to 20 carbon atoms, alkenyl having 2 to 20 carbon atoms, alkylaryl having 7 to 30 carbon atoms, arylalkyl having 7 to 30 carbon atoms, or aryl having 6 to 30 carbon atoms, $R^2$ is hydrogen, alkyl having 1 to 20 carbon atoms, alkenyl having 2 to 20 carbon atoms, alkylaryl having 7 to 30 carbon atoms, arylalkyl having 7 to 30 carbon atoms, or aryl having 6 to 30 carbon atoms, $R^3$ and $R^5$ are identical to or different from each other, and each independently, alkyl having 1 to 20 carbon atoms, $R^4$ and $R^6$ are each independently alkyl aryl having 7 to 30 carbon atoms or aryl having 6 to 30 carbon atoms, in $R^3$, $R^4$, $R^5$ and $R^6$, $R^3$ and $R^5$ are different substituents from each other, or $R^4$ and $R^6$ are different substituents from each other, $$(Cp^{21}R^{21})_n(Cp^{22}R^{22})M^2(X^2)_{3-n}$$ [Chemical Formula 2]

in Chemical Formula 2, $M^2$ is a Group 4 transition metal;

$Cp^{21}$ and $Cp^{22}$ are identical to or different from each other, and each independently, any one selected from the group consisting of cyclopentadienyl, indenyl, 4,5,6,7-tetrahydro-1-indenyl, and fluorenyl radical, wherein $Cp^{21}$ and $Cp^{22}$ are optionally substituted with hydrocarbon having 1 to 20 carbon atoms;

$R^{21}$ and $R^{22}$ are identical to or different from each other, and each independently, hydrogen, alkyl having 1 to 20 carbon atoms, alkoxy having 1 to 10 carbon atoms, alkoxyalkyl having 2 to 20 carbon atoms, aryl having 6 to 20 carbon atoms, aryloxy having 6 to 10 carbon atoms, alkenyl having 2 to 20 carbon atoms, alkylaryl having 7 to 40 carbon atoms, arylalkyl having 7 to 40 carbon atoms, arylalkenyl having 8 to 40 carbon atoms, or alkynyl having 2 to 10 carbon atoms;

$X^2$ is a halogen atom, alkyl having 1 to 20 carbon atoms, alkenyl having 2 to 10 carbon atoms, alkylaryl having 7 to 40 carbon atoms, arylalkyl having 7 to 40 carbon atoms, aryl having 6 to 20 carbon atoms, substituted or unsubstituted alkylidene having 1 to 20 carbon atoms, substituted or unsubstituted amino group, alkylalkoxy having 2 to 20 carbon atoms or arylalkoxy having 7 to 40 carbon atoms; and n is 1 or 0.

The present invention uses a precursor containing a transition metal compound represented by Chemical Formula 1 and a transition metal compound represented by Chemical Formula 2 in a specific ratio in order to improve the physical properties and productivity of a conventional catalyst, and thereby, can provide a catalyst composition having higher activity and higher copolymerizability than before. The present invention can achieve excellent processability and physical properties by providing a catalyst composition having a high copolymerizability, and can realize a reduction of catalyst cost based on excellent catalyst activity. That is, when the olefin polymer is prepared using the catalyst composition of the present invention, the molecular weight distribution can be broadened, and thus, long-term physical property (FNCT) and processability can be improved.

In the catalyst composition of the present invention, a molar ratio (A:B) of a compound (A) represented by Chemical Formula 1 and a compound (B) represented by Chemical Formula 2 may be 1.6:1 to 18:1, or 5:1 to 15:1, or 7:1 to 15:1. At this time, when the molar ratio (A:B) of Chemical Formula 1 and Chemical Formula 2 is 1.6:1 or less, there is a problem that the catalytic activity does not reach the desired level, and the long-term physical property (FNCT) and stress-crack resistance (processability) are very poor. If the molar ratio (A:B) is 18:1 or more, there is a problem that catalyst activity and stress-crack resistance (processability) are low even if the molecular weight distribution is narrow.

At this time, in the specification of the present invention, the catalyst composition may refer to a hybrid supported metallocene catalyst in which two kinds of transition metal compounds of Chemical Formulas 1 and 2 described above are supported on a carrier, respectively. In addition, the hybrid supported metallocene catalyst may further include a cocatalyst compound.

Meanwhile, unless specifically limited herein, the following terms may be defined as follows.

The Group 4 transition metal may include titanium (Ti), zirconium (Zr), hafnium (Hf), and the like, and preferably zirconium.

Halogen may be fluorine (F), chlorine (Cl), bromine (Br) or iodine (I).

An alkyl having 1 to 20 carbon atoms may be linear, branched or cyclic alkyl. Specifically, the alkyl having 1 to 20 carbon atoms may be linear alkyl having 1 to 20 carbon atoms; linear alkyl having 1 to 10 carbon atoms; linear alkyl of 1 to 5 carbon atoms; branched or cyclic alkyl having 3 to 20 carbon atoms; branched or cyclic alkyl having 3 to 15 carbon atoms; or branched or cyclic alkyl having 3 to 10 carbon atoms. More specifically, the alkyl having 1 to 20 carbon atoms may be methyl group, ethyl group, n-propyl group, iso-propyl group, n-butyl group, iso-butyl group, tert-butyl group, n-pentyl group, iso-pentyl group or cyclohexyl group, etc.

An alkenyl having 2 to 20 carbon atoms may be linear, branched or cyclic alkyl. Specifically, the alkenyl having 2 to 20 carbon atoms may be linear alkenyl having 2 to 20 carbon atoms, linear alkenyl having 2 to 10 carbon atoms, linear alkenyl having 2 to 5 carbon atoms, branched alkenyl having 3 to 20 carbon atoms, branched alkenyl having 3 to 15 carbon atoms, branched alkenyl having 3 to 10 carbon atoms, cyclic alkenyl having 5 to 20 carbon atoms or cyclic alkenyl having 5 to 10 carbon atoms. More specifically, the alkenyl having 2 to 20 carbon atoms may be ethenyl, propenyl, butenyl, pentenyl, or cyclohexenyl, etc.

An aryl having 6 to 20 carbon atoms or 6 to 30 carbon atoms may mean monocyclic, bicyclic or tricyclic aromatic hydrocarbon. Specifically, the aryl having 6 to 20 carbon atoms or 6 to 30 carbon atoms may be phenyl, naphthyl or anthracenyl, etc.

An alkylaryl having 7 to 30 carbon atoms or 7 to 40 carbon atoms may mean aryl of which one or more hydrogen atoms are substituted with alkyl. Specifically, the alkylaryl having 7 to 30 carbon atoms or 7 to 40 carbon atoms may be methylphenyl, ethylphenyl, n-propylphenyl, iso-propylphenyl, n-butylphenyl, iso-butylphenyl, tert-butylphenyl, or cyclohexylphenyl, etc.

An arylalkyl having 7 to 30 carbon atoms or 7 to 40 carbon atoms may mean alkyl of which one or more hydrogen atoms are substituted with aryl. Specifically, the arylalkyl having 7 to 30 carbon atoms or 7 to 40 carbon atoms may be a benzyl group, phenylpropyl or phenylhexyl, etc.

The alkoxy group having 1 to 20 carbon atoms may include a methoxy group, an ethoxy group, a phenyloxy group, a cyclohexyloxy group, a tert-butoxyhexyl group, etc.

The above-described substituents may be optionally substituted with one or more substituents selected from the group consisting of hydroxy, halogen, alkyl, heterocycloalkyl, alkoxy, alkenyl, silyl, sulfonate, sulfone, aryl and heteroaryl within a range that exhibits the same to similar effects as the intended effects.

The transition metal compound represented by the Chemical Formula 1 includes two indenyl groups as ligands in which different substituents are introduced at position 2 ($R^3$ and $R^5$) or position 4 ($R^4$ and $R^6$), and has a structure wherein a functional group capable of acting as Lewis base is included as an oxygen donor in the bridge group connecting the two ligands. As an example, if the transition metal compound having such a specific structure is activated by an appropriate method and used as a catalyst in a polymerization reaction of an olefin polymer, an olefin polymer exhibiting high activity and having a high molecular weight can be prepared.

Specifically, in the structure of the transition metal compound represented by Chemical Formula 1, the indenyl ligand affects the olefin polymerization activity, and the degree of the steric hindrance effect can be adjusted according to the type of the substituted functional group, thereby easily adjusting the molecular weight of the produced olefin polymer.

In particular, in Chemical Formula 1, when $R^3$ and $R^5$ are different from each other and each independently, any one of alkyl having 1 to 4 carbon atoms, and $R^4$ and $R^6$ are different from each other and each independently, any one of alkylaryl having 7 to 12 carbon atoms and aryl having 6 to 12 carbon atoms, a high molecular weight olefin polymer can be easily prepared. More specifically, the $R^3$ and $R^5$ may be each independently methyl, ethyl, n-propyl, iso-propyl, n-butyl or t-butyl, etc., and $R^4$ and $R^6$ may each independently be iso-propylphenyl, iso-butylphenyl, t-butylphenyl or naphthyl, etc.

In the Chemical Formula 1, the bridge group connecting the ligands may have an influence on the supporting stability of the transition metal compound. As an example, when $R^1$ is alkyl having 1 to 20 carbon atoms, the supporting efficiency for bulk polymerization may be increased. Further, when n' is an integer between 3 and 9, $R^2$ is any one of hydrogen and alkyl having 1 to 20 carbon atoms, and A is C or Si, further excellent supporting stability can be ensured.

On the other hand, the storage stability of the metal complex can be improved by using any one of Group 4 transition metals as $M^1$.

Further, in Chemical Formula 1, n' may be an integer of 1 to 20, preferably an integer of 1 to 10, or 1 to 6, or 2 to 6.

It may be preferable that the compound represented by Chemical Formula 1 is represented by the following Chemical Formula 1-1.

[Chemical Formula 1-1]

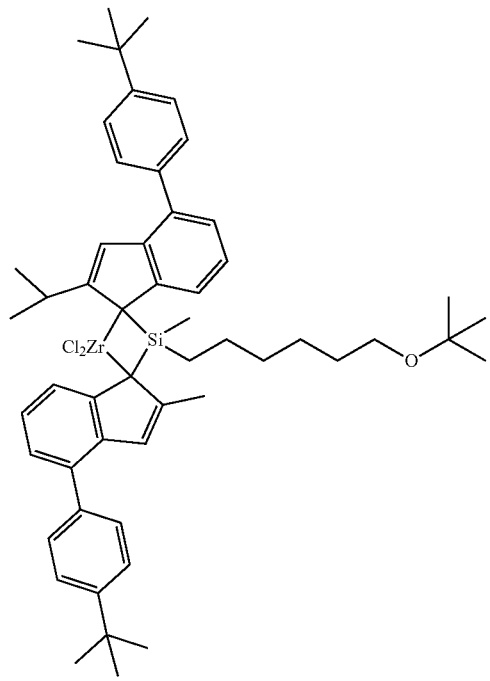

The transition metal compound represented by Chemical Formula 1 may be synthesized by applying known reactions, and for a more detailed synthesis method, refer to Examples.

According to an embodiment of the invention, the compound represented by Chemical Formula 2 may be selected from the group consisting of compounds represented by the following structural formulas.

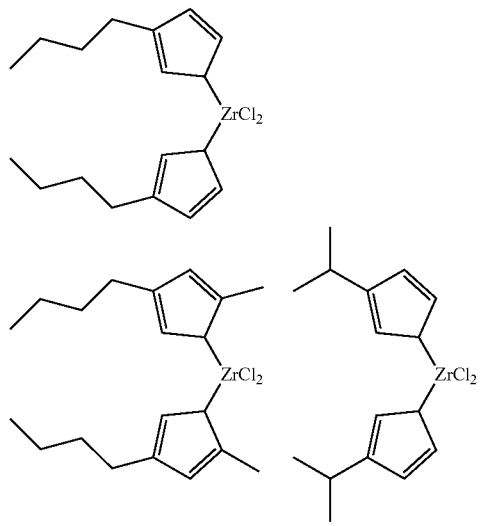

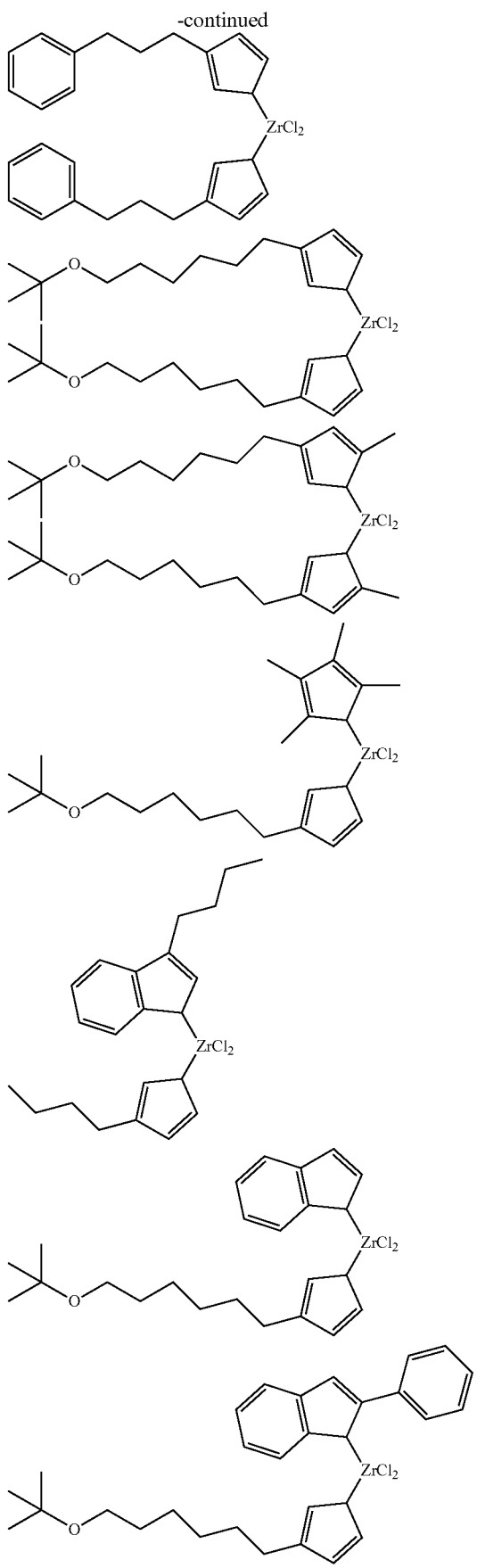

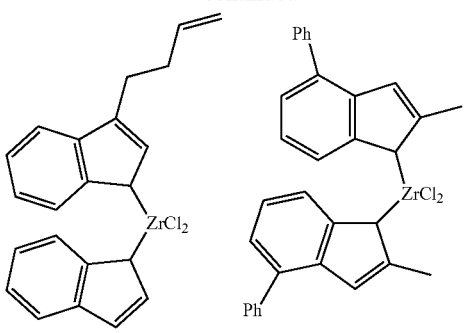
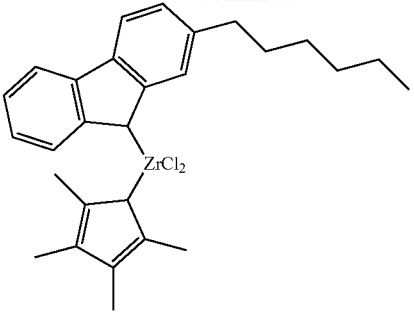
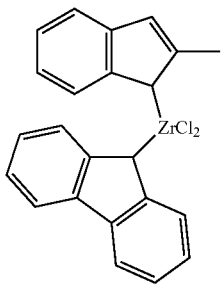
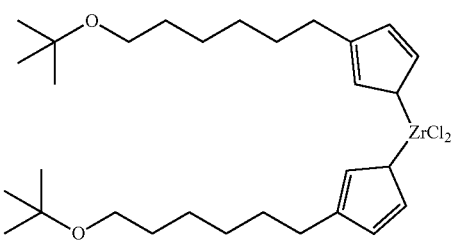

Further, it may be more preferable that the compound represented by Chemical Formula 2 is represented by the following Chemical Formula 2-1.

[Chemical Formula 2-1]

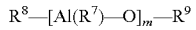

The catalyst composition may further include a cocatalyst capable of activating a transition metal compound. As such a cocatalyst, those commonly used in the technical field to which the present invention pertains may be used without particular limitation. As a non-limiting example, the cocatalyst may be one or more compounds selected from the group consisting of the compounds represented by the following Chemical Formulas 3 to 5.

$$R^8\text{—}[Al(R^7)\text{—}O]_m\text{—}R^9 \quad \text{[Chemical Formula 3]}$$

in Chemical Formula 3,
$R^7$, $R^8$ and $R^9$ are each independently hydrogen, halogen, a hydrocarbyl group having 1 to 20 carbon atoms or a hydrocarbyl group having 1 to 20 carbon atoms substituted with halogen, and
m is an integer of 2 or more, $$D(R^{10})_3 \quad \text{[Chemical Formula 4]}$$

in Chemical Formula 4,
D is aluminum or boron, and
$R^{10}$ is each independently halogen, a hydrocarbyl group having 1 to 20 carbon atoms, a hydrocarbyloxy group having 1 to 20 carbon atoms or hydrocarbyl group having 1 to 20 carbon atoms substituted with halogen, $$[L\text{-}H]^+[W(J)_4]^- \text{ or } [L]^+[W(J)_4]^- \quad \text{[Chemical Formula 5]}$$

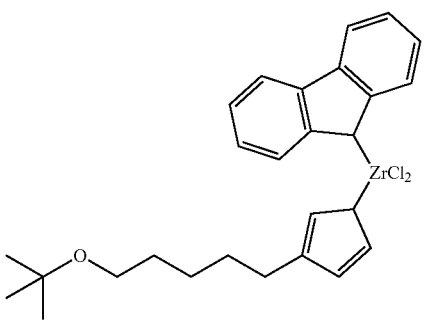
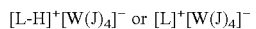

in Chemical Formula 5,
L is neutral or cationic Lewis base,
W is a Group 13 atom, and each J is each independently, a hydrocarbyl group having 1 to 20 carbon atoms; a hydrocarbyloxy group having 1 to 20 carbon atoms; or a hydrocarbyl group having 1 to 20 carbon atoms or a hydrocarbyloxy group having 1 to 20 carbon atoms of which one or more hydrogen atoms are substituted with one or more substituents selected from the group consisting of halogen,

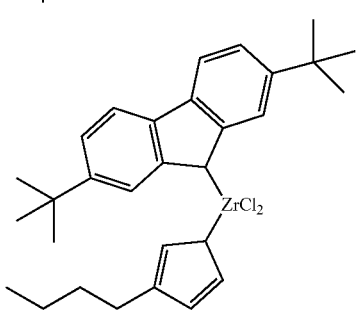

a hydrocarbyloxy group having 1 to 20 carbon atoms and a hydrocarbyl(oxy)silyl group having 1 to 20 carbon atoms.

Unless specifically limited herein, the following terms may be defined as follows.

A hydrocarbyl group is a monovalent functional group in which hydrogen atom is removed from hydrocarbon, and it may include an alkyl group, an alkenyl group, an alkynyl group, an aryl group, an aralkyl group, an aralkenyl group, an aralkynyl group, an alkylaryl group, an alkenylaryl group, and an alkynylaryl group, etc. And, a hydrocarbyl group having 1 to 20 carbon atoms may be a hydrocarbyl group having 1 to 15 carbon atoms or 1 to 10 carbon atoms. Specifically, a hydrocarbyl group having 1 to 20 carbon atoms may be a linear, branched or cyclic alkyl group such as a methyl group, an ethyl group, an n-propyl group, an iso-propyl group, an n-butyl group, an iso-butyl group, a tert-butyl group, an n-pentyl group, an n-hexyl group, an n-heptyl group, a cyclohexyl group, etc.; or an aryl group such as a phenyl group, a naphthyl group, an anthracenyl group, etc.

A hydrocarbyloxy group is a functional group in which a hydrocarbyl group is bonded to oxygen. Specifically, a hydrocarbyloxy group having 1 to 20 carbon atoms may be a hydrocarbyloxyl group having 1 to 15 carbon atoms or 1 to 10 carbon atoms. More specifically, a hydrocarbyloxy group having 1 to 20 carbon atoms may be a linear, branched or cyclic alkoxy group such as a methoxy group, an ethoxy group, an n-propoxy group, an iso-propoxy group, an n-butoxy group, an iso-butoxy group, a tert-butoxy group, an n-pentoxy group, an n-hexoxy group, an n-heptoxy group, a cycloheptoxy group, etc.; or an aryloxy group such as a phenoxy group, a naphthaleneoxy group, etc.

A hydrocarbyl(oxy)silyl group is a functional group in which 1 to 3 hydrogen atoms of —$SiH_3$ are substituted with 1 to 3 hydrocarbyl groups or hydrocarbyloxy groups. Specifically, a hydrocarbyl(oxy)silyl group having 1 to 20 carbon atoms may be a hydrocarbyl(oxy)silyl group having 1 to 15 carbon atoms, 1 to 10 carbon atoms or 1 to 5 carbon atoms. More specifically, a hydrocarbyl(oxy)silyl group having 1 to 20 carbon atoms may be an alkylsilyl group such as a methylsilyl group, a dimethylsilyl group, a trimethylsilyl group, a dimethylethylsilyl group, a diethylmethylsilyl group, a dimethylpropylsilyl group, etc.; an alkoxysilyl group such as a methoxysilyl group, a dimethoxysilyl group, a trimethoxysilyl group, a dimethoxyethoxysilyl group, etc.; or an alkoxyalkylsilyl group such as a methoxydimethylsilyl group, a diethoxymethylsilyl group, a dimethoxypropylsilyl group, etc.

Non-limiting examples of the compounds represented by Chemical Formula 2 may include methylaluminoxane, ethylaluminoxane, isobutylaluminoxane, or tert-butylaluminoxane, etc. And, non-limiting examples of the compounds represented by Chemical Formula 3 may include trimethylaluminum, triethylaluminum, tri isobutylaluminum, tripropylaluminum, tributylaluminum, dimethylchloroaluminum, triisopropylaluminum, tri-sec-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminum methoxide, dimethylaluminum ethoxide, etc. Finally, non-limiting examples of the compounds represented by Chemical Formula 4 may include trimethylammonium tetrakis(pentafluorophenyl)borate, triethylammonium tetrakis(pentafluorophenyl)borate, N,N-dimethylanilinium tetrakis(pentafluorophenyl)borate, N,N-dimethylanilinium n-butyltris(pentafluorophenyl)borate, N,N-dimethylanilinium benzyltris(pentafluorophenyl)borate, N,N-dimethylanilinium tetrakis(4-(t-butyldimethylsilyl)-2,3,5,6-tetrafluorophenyl)borate, N,N-dimethylanilinium tetrakis(4-(triisopropylsilyl)-2,3,5,6-tetrafluorophenyl)borate, N,N-dimethylanilinium pentafluorophenoxytris(pentafluorophenyl)borate, N,N-dimethyl(2,4,6-trimethylanilinium) tetrakis(pentafluorophenyl)borate, trimethylammonium tetrakis(2,3,4,6-tetrafluorophenyl)borate, N,N-dimethylanilinium tetrakis(2,3,4,6-tetrafluorophenyl)borate, hexadecyldimethylammonium tetrakis(pentafluorophenyl)borate, N-methyl-N-dodecylanilinium tetrakis(pentafluorophenyl)borate or methyldi(dodecyl)ammonium tetrakis(pentafluorophenyl)borate, etc.

The amount of the promoter used may be appropriately adjusted according to the physical properties or effects of the desired catalyst composition.

The catalyst composition may be a supported catalyst in which the above-described transition metal compound is supported on a carrier. Since the transition metal compound represented by Chemical Formula 1 has the above-described structural characteristics, it can be stably supported on a carrier. And, the supported catalyst in which such a transition metal compound is supported exhibits high activity for olefin polymerization, and can easily provide low molecular weight olefin polymer.

As the carrier, carriers containing hydroxy groups or siloxane groups on the surface may be used. Specifically, as the carrier, carriers that is dried at high temperature to remove moisture on the surface, thus containing highly reactive hydroxy groups or siloxanes groups may be used. More specifically, as the carrier, silica, alumina, magnesia or a mixture thereof may be used. The carrier may be dried at high temperature, and commonly comprise oxide, carbonate, sulfate, nitrate components such as $Na_2O$, $K_2CO_3$, $BaSO_4$ and $Mg(NO_3)_2$, etc.

Meanwhile, according to still another embodiment of the present invention, a method for preparing olefin polymer comprising the step of polymerizing olefin monomers in the presence of the catalyst composition is provided.

As described above, the catalyst composition, due to the specific structure, can easily provide low molecular weight olefin polymer compared to polyolefin polymerized using the existing metallocene catalyst, and exhibit higher activity when polymerizing olefin monomers.

Examples of the olefin monomers that can be polymerized with the catalyst composition may include ethylene, alpha-olefin, cyclic olefin, etc., and dien olefin monomers or trien olefin monomers, etc. having two or more double bonds can be also polymerized. Specific examples of the monomers may include ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbonadiene, ethylidene norbordene, phenyl norbordene, vinyl norbordene, dicylcopentadiene, 1,4-butadiene, 1,5-pentadiene, 1,6-hexadiene, styrene, alpha-methylstyrene, divinylbenzene, 3-chloromethlystyrene, etc., and two or more kinds of the monomers may be mixed and copolymerized.

For the polymerization reaction of olefin monomers, various polymerization processes known as a polymerization reaction of olefin monomers, such as a continuous type solution polymerization process, a bulk polymerization process, a suspension polymerization process, a slurry polymerization process, or an emulsion polymerization process, etc. may be used.

Specifically, the polymerization reaction may be conducted at a temperature of about 50 to 110° C. or about 60 to 100° C. and a pressure of about 1 to 100 $kgf/cm^2$.

And, in the polymerization reaction, the catalyst composition may be used while being dissolved or diluted in a solvent such as pentane, hexane, heptanes, nonane, decane, toluene, benzene, dichloromethane, chlorobenzene, etc. In this case, the solvent may be treated with a small amount of alkylaluminium, etc., thus removing a small amount of water or air, etc. that may have a bad influence on the catalyst in advance.

Since the olefin polymer prepared by the above described method is prepared using the above-described supported catalyst, it has significantly high molecular weight, and thus, can have high melting temperature and high crystallization temperature compared to the olefin polymer prepared from a conventional metallocene catalyst.

Hereinafter, the actions and effects of the present invention will be explained in more detail with reference to specific examples. However, these examples are presented only as the illustration of the invention and the scope of the present invention is not limited thereto.

Preparation Example 1: Preparation of Transition Metal Compound (A) of Chemical Formula 1

Step 1: Preparation of (6-t-butoxyhexyl)dichloromethylsilane

Into a 1 L flask, 95 g of Mg was put and washed three times with 1.0M HCl, three times with MeOH and three times with acetone, and then, dried under reduced pressure at 25° C. for 3 hours. Into the reactor containing the dried Mg, 1.0 L of THF, and 5.0 mL of 1,2-DBE were sequentially introduced, and the mixture was stirred. 500 g of t-butoxyhexyl chloride was introduced into a dropping funnel, and then, about 5% thereof was introduced into the reactor for 5 minutes. Thereafter, the temperature of the reactor was raised to 70° C. and the reaction mixture was stirred for 30 minutes. Subsequently, the remaining amount of t-butoxyhexyl chloride was slowly introduced into the reactor over about 3 hours, and the reaction mixture was stirred at a temperature of 70° C. for about 15 hours. Thereafter, the reactor was cooled to 25° C., the reaction mixture was filtered to remove an excessive amount of Mg, and the filtrate was transferred to a 3 L flask.

Meanwhile, the reactor was washed and dried under reduced pressure, and then, 583 g of trichloromethylsilane and 3.3 L of THF were introduced into the reactor, and the reactor was cooled to −15° C. Thereafter, to the reactor, the above prepared filtrate was slowly added dropwise while maintaining at −5° C. for 2 hours. The temperature of the reactor was raised to 25° C., and the reaction mixture was stirred at about 130 rpm for 16 hours. Thereafter, the reaction mixture was vacuum distilled at 25° C., and dispersed in 4.3 L of hexane, and then, stirred for 30 minutes. Thereafter, solid was filtered from the reaction mixture, and then, the reaction mixture was additionally washed with 1.0 L of hexane and filtered, and the filtrate was vacuum distilled at 25° C. to obtain (6-t-butoxyhexyl)dichloromethylsilane in a yield of 85%.

Step 2: Preparation of 6-(t-butoxy)hexyl)(4-(4-(t-butyl)phenyl)-2-isopropyl-1H-inden-1-yl)(methyl) (2-methyl-4-(4-(t-butyl)phenyl)-1H-inden-1-yl)silane 20 g (76.222 mmol) of 2-isopropyl-4-(4-(t-butyl)phenyl) indene was dissolved in 640 mL of a mixed solvent (Hex/MTBE=15/1), and then 33.5 mL of n-butyllithium solution (2.5M solution in hexane) was slowly added dropwise to the solution at −20° C. Thereafter, the obtained reaction mixture was stirred at room temperature for one day, and then 80.5 mL of a solution of the above prepared (6-t-butoxyhexyl) dichloromethylsilane (19.7 g, 72.411 mmol) dissolved in hexane was slowly added to the mixed solution at −20° C., and the obtained reaction mixture was stirred at room temperature for one day. Thereafter, the reaction mixture was vacuum distilled to remove the solvent, which was redispersed in hexane and filtered under reduced pressure. Then, the filtered solution was dried to obtain monosilane.

Meanwhile, in a separately prepared flask, 22.1 g (76.222 mmol) of 2-methyl-4-(4-(t-butyl)phenyl)indene and 136.5 mg (1.525 mmol) of CuCN were dissolved in 200 mL of diethyl ether, and then 33.5 mL of n-butyllithium solution (2.5M solution in hexane) was slowly added dropwise to the solution at −20° C. Thereafter, the obtained reaction mixture was stirred at room temperature for one day, and then the previously prepared monosilane was dissolved in 180 mL of diethyl ether and then added to the reaction mixture. Thereafter, the obtained reaction mixture was stirred at room temperature for one day, and then organic materials were extracted using water and MTBE. Then, the vacuum distilled product was purified by column chromatography to obtain the final ligand in a yield of 67%.

Step 3: Preparation of (6-(t-butoxy)hexyl)(4-(4-(t-butyl)phenyl)-2-isopropyl-1H-inden-1-yl)(methyl) (2-methyl-4-(4-(t-butyl)phenyl)-1H-inden-1-yl)silane zirconium dichloride 1.00 g (1.331 mmol) of the previously prepared 6-(t-butoxy)hexyl)(4-(4-(t-butyl)phenyl)-2-isopropyl-1H-inden-1-yl)(methyl)(2-methyl-4-(4-(t-butyl)phenyl)-1H-inden-1-yl)silane was dissolved in 33 mL of diethyl ether, and then, 1.1 mL of n-butyllithium solution (2.5M solution in hexane) was slowly added dropwise to the solution at −20° C. Thereafter, the obtained reaction mixture was stirred at room temperature for about 4 hours, and then, 706 mg (1.331 mmol) of bis(N,N'-diphenyl-1,3-propanediazido)dichlorozirconium bis(tetrahydrofuran) [Zr $(C_5H_6NCH_2CH_2CH_2NC_5H_6)Cl_2(C_4H_5O)_2$] was dissolved in 33 mL of diethyl ether and added to the reaction mixture at room temperature, and then the mixture was stirred for one day. Thereafter, the red reaction solution was cooled to −20° C., and 4 equivalents of 1M HCl ether solution was slowly added dropwise to the cooled solution, and then the obtained solution was again stirred at room temperature for 1 hour. Thereafter, it was filtered and vacuum dried, and the obtained solid was dissolved in pentane, and then, crystals were precipitated for 48 hours, and filtered under reduced pressure, and then the solid was dried to obtain an orange transition metal compound in a yield of 8% (rac only).

$^1$H NMR (500 MHz, CDCl$_3$, 7.26 ppm): 1.05 (3H, d), 1.09 (3H, d), 1.20 (3H, s), 1.34 (9H, s), 1.50~1.93 (10H, m), 2.27~2.31 (1H, m), 3.37 (2H, t), 6.48 (1H, s) 6.98 (1H, s), 7.01 (1H, s), 7.09~7.12 (2H, m), 7.34~7.70 (12H, m)

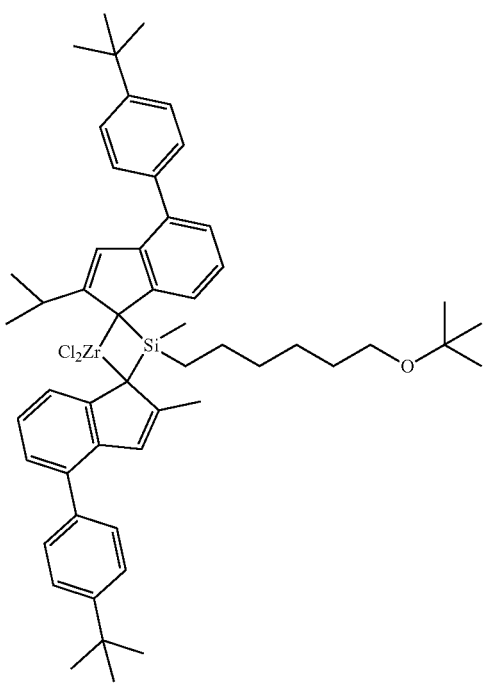

Preparation Example 2: Preparation of Transition Metal Compound (B) of Chemical Formula 1

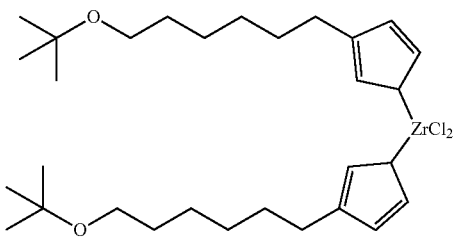

t-Butyl-O—(CH$_2$)$_6$—Cl was prepared by the method presented in Tetrahedron Lett. 2951 (1988) using 6-chlorohexanol, to which NaCp was reacted to obtain t-butyl-O—(CH$_2$)$_6$—C$_5$H$_5$ (yield: 60%, b.p. 80° C./0.1 mmHg).

In addition, t-butyl-O—(CH$_2$)$_6$—C$_5$H$_5$ was dissolved in THF at −78° C., and normal butyllithium (n-BuLi) was slowly added, and the mixture was heated to room temperature and then reacted for 8 hours. The previously synthesized lithium salt solution was again slowly added to a suspension solution of ZrCl$_4$(THF)$_2$ (1.70 g, 4.50 mmol)/THF (30 mL) at −78° C., and the mixture was further reacted at room temperature for 6 hours.

All volatile materials were dried under vacuum, and a hexane solvent was added to the obtained oily liquid material and filtered. The filtered solution was dried under vacuum and then hexane was added to induce a precipitate at low temperature (−20° C.). The obtained precipitate was filtered at low temperature to obtain a tBu-O—(CH$_2$)$_6$—C$_5$H$_4$]$_2$ZrCl$_2$ compound as a white solid (yield: 92%).

$^1$H NMR (300 MHz, CDCl$_3$): 6.28 (t, J=2.6 Hz, 2H), 6.19 (t, J=2.6 Hz, 2H), 3.21 (t, 6.6 Hz, 2H), 2.62 (t, J=8 Hz), 1.7-1.3 (m, 8H), 1.17 (s, 9H).

$^{13}$C NMR (CDCl$_3$): 135.09, 116.66, 112.28, 72.42, 61.52, 30.66, 30.61, 30.14, 29.18, 27.58, 26.00.

Preparation Example 3 Preparation of Ziegler-Natta Catalyst

In order to prepare a Ziegler-Natta catalyst, 500 kg of magnesium ethylate was dispersed in a sufficient amount of hexane, and then 1700 kg of tetrachloride titanium was slowly added dropwise at 85° C. over 5.5 hours and then tempered at 120° C. Thereafter, unreacted by-products containing the titanium compound were removed until the titanium concentration of the total solution became 500 mmol, and preactivated by contacting with triethylaluminum at 120° C. for 2 hours to remove unreacted by-products. Thereby, the final catalyst was obtained.

Example 1

Preparation of Catalyst Composition
1) Drying of Carrier
Silica (SYLOPOL 948, manufactured by Grace Davison) was dehydrated under vacuum at a temperature of 200° C. for 15 hours.
2) Catalyst Composition (Preparation of Supported Catalyst)
10 g of dried silica was placed in a glass reactor, and 100 mL of toluene was further added and stirred. 50 mL of a 10 wt % methylaluminoxane (MAO)/toluene solution was added thereto, the temperature was raised to 60° C., and then the mixture was reacted with stirring for 12 hours. After the temperature of the reactor was lowered to 40° C., the stirring was stopped, the product was allowed to settle for 10 minutes, and then toluene was decanted.

Toluene was charged up to 100 mL of the reactor, 0.05 mmol of the transition metal compound (A) of Preparation Example 1 was dissolved in 10 ml of toluene, and added together, and the mixture was reacted for 1 hour. After the reaction was completed, 0.01 mmol of the transition metal compound prepared (B) of Preparation Example 2 was dissolved in 10 ml of toluene, and added together, and the mixture was reacted for 1 hour.

After the reaction was completed, the stirring was stopped, and the toluene layer was separated and removed. Then, the pressure was reduced at 50° C. to remove the toluene, thereby preparing a supported catalyst.

Example 2

A supported catalyst was prepared in the same manner as in Example 1, except that the transition metal compound (A) of Preparation Example 1 was used in an amount of 0.1 mmol in Example 1.

Example 3

A supported catalyst was prepared in the same manner as in Example 1, except that the transition metal compound (A) of Preparation Example 1 was used in an amount of 0.15 mmol in Example 1.

Comparative Example 1

A catalyst composition (silica supported metallocene catalyst) was prepared in the same manner as in Example 1, except that 0.01 mmol of the transition metal compound (B) of Preparation Example 2 and 0.1 mmol of the transition metal compound (C) represented by the following Chemical Formula C were used so as to be a molar ratio (1/10) shown in Table 1 below, instead of the composition (A/B) of the transition metal compound of the present invention.

[Chemical Formula C]

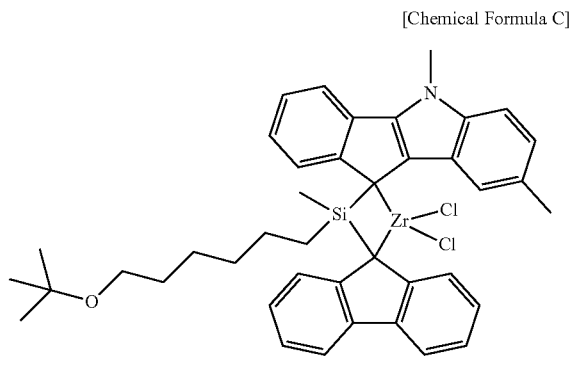

Comparative Example 2

A catalyst composition (silica-supported metallocene catalyst) was prepared in the same manner as in Example 1, except that the conventional general Ziegler-Natta catalyst (Z/N catalyst) prepared in Preparation Example 3 was used in an amount of 0.1 mmol.

Comparative Example 3

A supported catalyst was prepared in the same manner as in Example 1, except that the transition metal compound (B) of Preparation Example 2 was used in an amount of 0.02 mmol in Example 1.

Comparative Example 4

A supported catalyst was prepared in the same manner as in Example 1, except that the transition metal compound (B) of Preparation Example 2 was used in an amount of 0.05 mmol in Example 1.

Comparative Example 5

A supported catalyst was prepared in the same manner as in Example 1, except that the transition metal compound (A) of Preparation Example 1 was used in an amount of 0.2 mmol in Example 1.

Comparative Example 6

A supported catalyst was prepared in the same manner as in Example 1, except that the transition metal compound (A) of Preparation Example 1 was used in an amount of 0.25 mmol in Example 1.

Comparative Example 7

A supported catalyst was prepared in the same manner as in Example 1, except that 0.0145 mmol of a compound of the following Formula was used instead of the transition metal compound of Preparation Example 1.

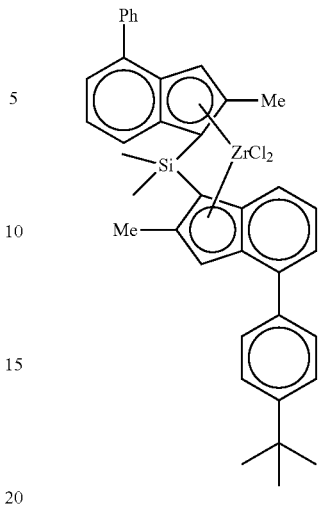

Comparative Example 8

A supported catalyst was prepared in the same manner as in Example 1, except that 0.01 mmol of a compound of the following Formula was used instead of the transition metal compound of Preparation Example 1.

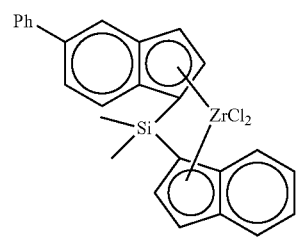

Test Example 1

Ethylene was subjected to slurry polymerization in the presence of each supported catalyst prepared in Examples and Comparative Examples to obtain an ethylene homopolymer.

In detail, 50 mg of each supported catalyst prepared in Examples 1 to 3 and Comparative Examples 1 to 8 were weighted in a dry box, and each was placed in a 50 mL glass bottle. The bottle was sealed with a rubber diaphragm, and taken out of the dry box, and a catalyst was prepared for injection. The polymerization was performed in a 2 L metal alloy reactor for high pressure, equipped with a mechanical stirrer and capable of temperature control.

1 L of hexane containing 1.0 mmol of triethylaluminum was injected into the reactor, and then the prepared supported catalyst was added thereto without contact with air. The polymerization was performed for an hour at 80° C., while continuously applying a gaseous ethylene monomer at a pressure of 9 kgf/cm². The polymerization was terminated by stopping the stirring and then exhausting and removing ethylene.

The polymer obtained therefrom was filtered through a polymerization solvent to remove most of the solvent, and then dried in a vacuum oven at 80° C. for 4 hours.

Test Example 2: Evaluation of Activity of Catalyst and Physical Properties of Ethylene Homopolymer The mass of the catalyst used for the polymer synthesis reaction of Examples 1 to 3 and Comparative Examples 1 to 8 and the mass of the polymer calculated per hour were measured, and the activity of each catalyst used in Examples and Comparative Examples was calculated. The results are shown in Table 1 below.

(1) Catalytic Activity (Kg PE/g $SiO_2$)

The catalytic activity was calculated as the ratio of the weight of produced polymer (kg PE) per catalyst content (g $SiO_2$) used per unit time (h).

(2) Molecular Weight (Mw) and Polydispersity Index (PDI) of the Polymer

Molecular weight, molecular weight distribution: Number average molecular weight, weight average molecular weight, and Z average molecular weight were measured using a gel permeation chromatography-FTIAL (GPC-FTIR) at a measurement temperature of 160° C. The molecular weight distribution was represented by the ratio of the weight average molecular weight and the number average molecular weight.

(3) Melt Index of the Polymer (MI 2.16)

Melt index (MI 2.16) was measured at 190° C. under a load of 2.16 kg according to ASTM D 1238 and expressed as the weight (g) of polymer melted for 10 minutes.

(4) MFRR ($MFR_{20}/MFR_2$): it is the ratio of $MFR_{20}$ melt index (MI, load of 21.6 kg) divided by $MFR_2$ (MI, load of 2.16 kg).

(5) BOCD Index (Broad Orthogonal Co-monomer Distribution index): In the analysis of the GPC-FTIR measurement results, the SCB content (unit: number/1,000° C.) was measured within a range of 30% (total 60%) on the left and right sides of the molecular weight distribution (MWD) based on the weight average molecular weight (Mw). The BOCD index was calculated by the following Mathematical Formula 1.

$$BOCD\ Index = \frac{(SCB\ content\ on\ the\ high\ molecular\ weight\ side - SCB\ content\ on\ the\ low\ molecular\ weight\ side)}{(SCB\ content\ on\ the\ low\ molecular\ weight\ side)}$$ [Mathematical Formula 1]

(6) Stress-Crack Resistance (FNCT, hr): As an evaluation method of molded articles of ethylene polymer, the test method of stress-crack resistance is described in M. Flissner in Kunststoffe 77 (1987), pp. 45 et seq. and this corresponds to ISO/FDIS 16770 that is currently in force. In respect of ethylene glycol, which was a stress-crack promotion medium using a tension of 3.5 Mpa at 80° C., and the breakage time was reduced due to the reduction in the stress initiation time by the notch (1.6 mm/safety razor blade).

For the preparation of the specimens, 750 ppm of a primary antioxidant (Irganox 1010, CIBA), 1500 ppm of a secondary antioxidant (Irgafos 168, CIBA) and 1000 ppm of a processing aid (SC110, Ca-St, Duboon Yuhaw Inc.) were added to each ethylene polymers (PE) of Examples and Comparative Examples, and granulation was performed at an extrusion temperature of 170° C. to 220° C. using a twin screw extruder (W&P Twin Screw Extruder, 75 pie, L/D=36). The extruding test for the processibility of the resin was performed under the conditions of 190 to 220° C. (Temp. Profile (° C.): 190/200/210/220) by using a Haake Single Screw Extruder (19 pie, L/D=25). In addition, the pipe was extruded and molded at an extrusion temperature of 220° C. by using a single screw extruder (Battenfeld Pipe M/C, 50 pie, L/D=22, compression ratio=3.5) so that the outer diameter was 32 mm and the thickness was 2.9 mm. Subsequently, three specimens having a size of 10 mm (width), 10 mm (height) and 90 mm (length) were manufactured by sawing the specimens from the plate compressed to have the thickness of 10 mm. In order to achieve this object, the safety razor blade was used in the notch device specifically manufactured and the central notch was provided to the specimen. The depth of the notch was 1.6 mm.

TABLE 1

| Precursor | Catalyst | A/B Ratio | Activity (KgPE/gSiO$_2$) | MW | PDI | MI2.16 | MFRR | BOCD Index | FNCT (hr) |
|---|---|---|---|---|---|---|---|---|---|
| Ex. 1 | A/B | 5/1 | 41 | 110,000 | 7.8 | 0.6 | 35 | 0.9 | 1800 |
| Ex. 2 | A/B | 10/1 | 40 | 114,000 | 7.8 | 0.5 | 40 | 1.2 | 2000 |
| Ex. 3 | A/B | 15/1 | 30 | 120,000 | 7.9 | 0.3 | 50 | 1.3 | 2300 |
| Comp. Ex. 1 | B/C | | 20 | 112,000 | 5.0 | 0.2 | 70 | 0.2 | 700 |
| Comp. Ex. 2 | Z/N catalyst | | 18 | 106,000 | 4.0 | 0.4 | 30 | 0.1 | 2100 |
| Comp. Ex. 3 | A/B | 1/2 | 22 | 80,000 | 6.0 | 1.0 | 10 | 0.2 | 200 |
| Comp. Ex. 4 | A/B | 1/5 | 24 | 50,000 | 4.0 | 3.0 | 8 | 0.1 | 100 |
| Comp. Ex. 5 | A/B | 20/1 | 10 | 200,000 | 4.1 | 0.05 | 15 | 0.7 | 900 |
| Comp. Ex. 6 | A/B | 25/1 | 8 | 280,000 | 3.5 | 0.01 | 13 | 0.6 | 800 |
| Comp. Ex. 7 | A/B | 1.45/1 | 43 | 100,000 | 7.2 | 0.8 | 23 | 0.5 | 1050 |
| Comp. Ex. 8 | A/B | 1/1 | 47 | 90,000 | 7.0 | 0.9 | 20 | 0.2 | 900 |

As shown in Table 1, it was confirmed that the polymers of Examples 1 to 3 of the present invention exhibited a high activity of 30 (KgPE/gSiO$_2$) or more by using a supported catalyst using a specific ratio of precursors, and were excellent in all of MFRR, BOCD, and FNCT. In particular, Example 3 exhibited the most excellent result.

However, Comparative Examples 1 to 8 had a low catalytic activity and a narrow molecular weight distribution, but had poor mechanical properties and processablity as a whole.

Therefore, the present invention can provide a polymer for a pipe having in which both mechanical properties and environmental stress-crack resistance (processability) were improved compared to Comparative Examples.

The invention claimed is:

1. A catalyst composition, comprising:
    a transition metal compound having a compound (A) represented by the following Chemical Formula 1 and a compound (B) represented by the following Chemical Formula 2 present in a molar ratio of 1.6:1 to 18:1

[Chemical Formula 1]

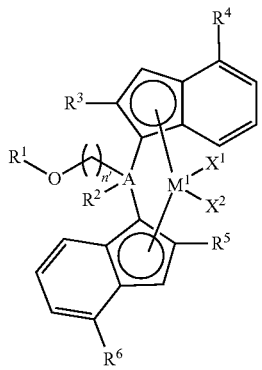

wherein, in Chemical Formula 1,

M$^1$ is a Group 3 transition metal, a Group 4 transition metal, a Group 5 transition metal, a lanthanides transition metal or an actinides transition metal, X$^1$ and X$^2$ are identical to or different from each other, and each independently, a halogen, A is a Group 14 atom, n' is an integer between 1 and 20, R$^1$ is alkyl having 1 to 20 carbon atoms, alkenyl having 2 to 20 carbon atoms, alkylaryl having 7 to 30 carbon atoms, arylalkyl having 7 to 30 carbon atoms, or aryl having 6 to 30 carbon atoms, R$^2$ is hydrogen, alkyl having 1 to 20 carbon atoms, alkenyl having 2 to 20 carbon atoms, alkylaryl having 7 to 30 carbon atoms, arylalkyl having 7 to 30 carbon atoms, or aryl having 6 to 30 carbon atoms, R$^3$ and R$^5$ are identical to or different from each other, and each independently, alkyl having 1 to 20 carbon atoms, R$^4$ and R$^6$ are each independently alkyl aryl having 7 to 30 carbon atoms or aryl having 6 to 30 carbon atoms, wherein R$^3$, R$^4$, R$^5$ and R$^6$, R$^3$ and R$^5$ are different substituents from each other, or R$^4$ and R$^6$ are different substituents from each other,

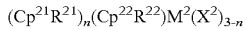
(Cp$^{21}$R$^{21}$)$_n$(Cp$^{22}$R$^{22}$)M$^2$(X$^2$)$_{3-n}$   [Chemical Formula 2]

wherein, in Chemical Formula 2,

M$^2$ is a Group 4 transition metal;

Cp$^{21}$ and Cp$^{22}$ are identical to or different from each other, and each independently, any one selected from the group consisting of cyclopentadienyl, indenyl, 4,5,6,7-tetrahydro-1-indenyl, and fluorenyl radical, wherein Cp$^{21}$ and Cp$^{22}$ are optionally substituted with hydrocarbon having 1 to 20 carbon atoms;

R$^{21}$ and R$^{22}$ are identical to or different from each other, and each independently, hydrogen, alkyl having 1 to 20 carbon atoms, alkoxy having 1 to 10 carbon atoms, alkoxyalkyl having 2 to 20 carbon atoms, aryl having 6 to 20 carbon atoms, aryloxy having 6 to 10 carbon atoms, alkenyl having 2 to 20 carbon atoms, alkylaryl having 7 to 40 carbon atoms, arylalkyl having 7 to 40 carbon atoms, arylalkenyl having 8 to 40 carbon atoms, or alkynyl having 2 to 10 carbon atoms;

X$^2$ is a halogen atom, alkyl having 1 to 20 carbon atoms, alkenyl having 2 to 10 carbon atoms, alkylaryl having 7 to 40 carbon atoms, arylalkyl having 7 to 40 carbon atoms, aryl having 6 to 20 carbon atoms, substituted or unsubstituted alkylidene having 1 to 20 carbon atoms, substituted or unsubstituted amino group, alkylalkoxy having 2 to 20 carbon atoms or arylalkoxy having 7 to 40 carbon atoms; and n is 1 or 0.

2. The catalyst composition of claim 1, wherein
in Chemical Formula 1, R$^3$ and R$^5$ are different from each other and each independently, an alkyl having 1 to 4 carbon atoms, and R$^4$ and R$^6$ are different from each other and each independently, alkylaryl having 7 to 12 carbon atoms or aryl having 6 to 12 carbon atoms.

3. The catalyst composition of claim 1, wherein
the compound represented by Chemical Formula 1 is represented by the following Chemical Formula 1-1.

[Chemical Formula 1-1]

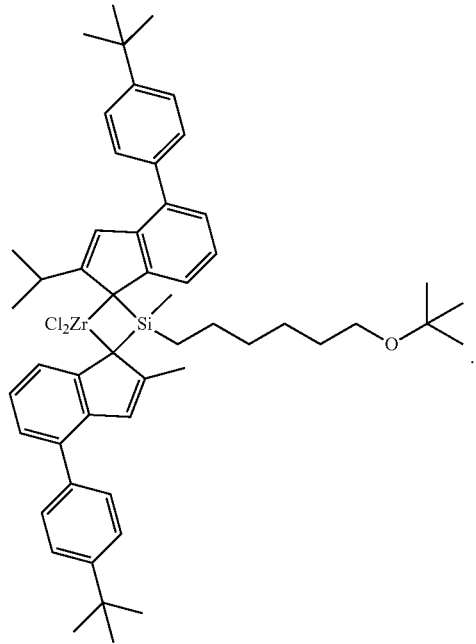

4. The catalyst composition of claim 1, wherein
the compound represented by Chemical Formula 2 is one selected from the group consisting of compounds represented by the following structural formulas.

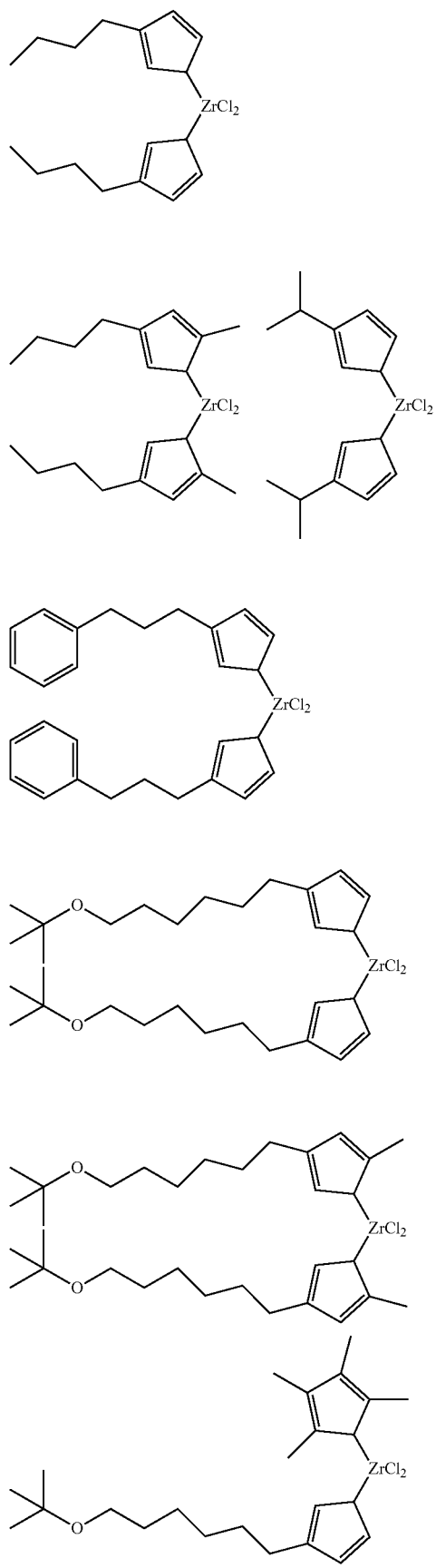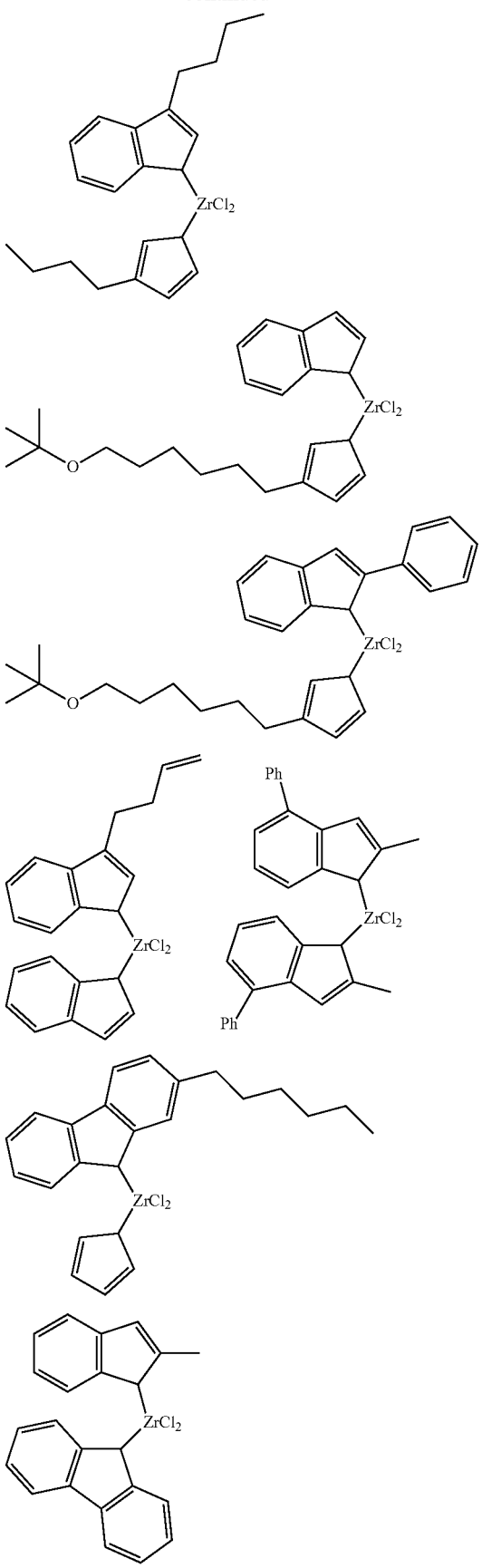

-continued

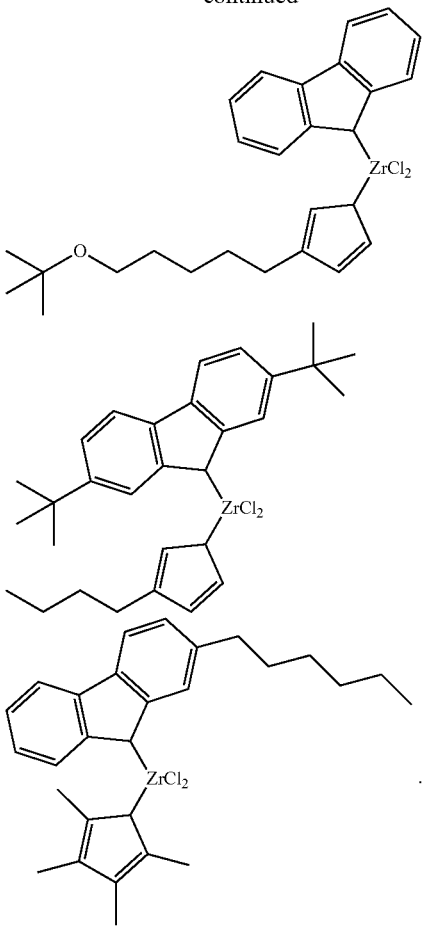

5. The catalyst composition of claim 1, further comprising:
one or more cocatalysts selected from the group consisting of the compounds represented by the following Chemical Formulas 3 to 5, $$R^8-[Al(R^7)-O]_m-R^9 \quad \text{[Chemical Formula 3]}$$

in Chemical Formula 3,
R$^7$, R$^8$ and R$^9$ are each independently any one of hydrogen, halogen, a hydrocarbyl group having 1 to 20 carbon atoms or a hydrocarbyl group having 1 to 20 carbon atoms substituted with halogen, and
m is an integer of 2 or more, $$D(R^{10})_3 \quad \text{[Chemical Formula 4]}$$

in Chemical Formula 4,
D is aluminum or boron, and
each R$^{10}$ is independently halogen, a hydrocarbyl group having 1 to 20 carbon atoms, a hydrocarbyloxy group having 1 to 20 carbon atoms or hydrocarbyl group having 1 to 20 carbon atoms substituted with halogen, $$[L-H]^+[W(J)_4]^- \text{ or } [L]^+[W(J)_4]^- \quad \text{[Chemical Formula 5]}$$

in Chemical Formula 5,
L is neutral or cationic Lewis base,
W is a Group 13 atom, and J is independently, a hydrocarbyl group having 1 to 20 carbon atoms, a hydrocarbyloxy group having 1 to 20 carbon atoms; or a hydrocarbyl group having 1 to 20 carbon atoms or a hydrocarbyloxy group having 1 to 20 carbon atoms of which one or more hydrogen atoms are substituted with one or more substituents selected from the group consisting of halogen, a hydrocarbyloxy group having 1 to 20 carbon atoms and a hydrocarbyl(oxy)silyl group having 1 to 20 carbon atoms.

6. The catalyst composition of claim 1, further comprising:
a carrier that supports the transition metal compound.

7. The catalyst composition of claim 6, wherein the carrier is silica, alumina, magnesia or a mixture thereof.

8. A method for preparing olefin polymer, comprising:
polymerizing olefin monomers in the presence of the catalyst composition of claim 1.

9. The method for preparing olefin polymer of claim 8, wherein
the olefin monomers include one or more selected from the group consisting of ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbonadiene, ethylidene norbordene, phenyl norbordene, vinyl norbordene, dicylcopentadiene, 1,4-butadiene, 1,5-pentadiene, 1,6-hexadiene, styrene, alpha-methylstyrene, divinylbenzene, and 3-chloromethlystyrene.

* * * * *